United States Patent Office 3,466,264
Patented Sept. 9, 1969

3,466,264
PROCESS FOR PREPARING GLYCOL MALEATE POLYESTERS
Hugh J. Hagemeyer, Jr., Willard P. Gleason, and Alfred G. Robinson III, Longview, Tex., assignors to Eastman Kodak Company, Rochester, N.Y., a corporation of New Jersey
No Drawing. Continuation-in-part of application Ser. No. 602,601, Dec. 19, 1966. This application July 23, 1968, Ser. No. 746,748
Int. Cl. C08g *17/03, 17/12*
U.S. Cl. 260—75   6 Claims

ABSTRACT OF THE DISCLOSURE

A process for preparing maleate polyesters of sterically hindered diols, said process comprising (1) heating a mixture of either maleic acid or maleic anhydride and a sterically hindered diol in the presence of a tin catalyst for at least four hours at less than about 145° C. and (2) heating the resultant mixture between about 160° C. and about 200° C. for an additional period of at least about two hours.

---

This application is a continuation-in-part of Hagemeyer, Jr., et al. U.S. Ser. No. 602,601, filed Dec. 19, 1966, now abandoned which in turn is a continuation-in-part of Hagemeyer, et al. U.S. Ser. No. 368,987, filed May 10, 1964, now abandoned and Hagemeyer, et al. U.S. Ser. No. 424,818, filed Jan. 11, 1965, now abandoned.

This invention relates to unsaturated polyesters prepared by reacting a sterically hindered diol (particularly 2,2,4-trimethyl-1,3-pentanediol) with an unsaturated acid (particularly maleic anhydride) and further relates to the use of these polyesters either alone or in blends with other vinyl materials. This invention also relates to the methods of preparing such polyesters.

Unsaturated polyesters prepared by the esterification of glycols of such materials as ethylene and propylene with unsaturated dicarboxylic acids or anhydrides are well known to the art and are quite useful. However, since these glycols are generally water soluble, the polyesters prepared therefrom are not adequately resistant to moisture. Moreover, in practice, such of these polyesters as are useful in reinforced plastics and in molding applications are generally prepared from a mixture of aromatic unsaturated dicarboxylic acids including phthalic anhydride and isophthalic or terephthalic acid. Such acids have been considered necessary heretofore to render the polyester compatible with common vinyl comononers such as styrene. In addition, the incorporation of such aromatic acids improves the flexural strength, flexural modulus, and brittleness properties of the cured or cross-linked polyester.

Although the use of aromatic dicarboxylic acids as modifiers in the preparation of unsaturated polyesters is a recognized expedient, it has several disadvantages. The use of these acids necessitates prolonged reaction periods in the preparation of the polyesters. This necessity apparently results from steric hindrance in the case of phthalic anhydride, and in the case of isophthalic or terephthalic acids, from their comparative insolubility in the reaction medium. In addition, the use of these aromatic acids adversely affects certain physical properties of the cured polyester such as its heat distortion temperature. In this regard, commercial polyesters generally have heat distortion temperatures in the range of 150–250° F. and the lack of higher heat resistance limits their usefulness in coating systems. Moreover, commercial curable polyester-styrene coatings show relatively high shrinkage values of about 7–10 percent during the curing process. Such shrinkage causes poor dimensional stability of the polyester coating.

Objects of the present invention, therefore, are: to provide unsaturated polyesters which have many of the advantages of prior polyesters of aromatic acids, but, which do not contain the aromatic dicarboxylic acid residues and hence do not have disadvantages of polymers employing the same; to provide resin systems including unsaturated polyester-vinyl material blends of superior dimensional stability and heat distortion resistance; and to provide a commercially practicable process for preparing such polyesters and blends.

These and other objects hereinafter becoming apparent have been achieved in accordance with the present invention through the discoveries that: the esterification of 2,2,4-trimethyl-1,3-pentanediol (TMPD) with maleic anhydride alone gives unsaturated polyesters having physical properties equivalent to or superior to similar polyesters prepared from mixtures of maleic anhydride and aromatic dicarboxylic acids; and that the polyester of TMPD and maleic anhydride is compatible with conventional vinyl comonomers, such as styrene, vinyl toluene, and methyl methacrylate, and impart the aforesaid desirable properties thereto.

The present TMPD maleate polyesters may have molecular weights up to about 4,000 with from about 1,800 to 3,000 being preferred. These molecular weights are determined with a 37° C. vapor pressure osmometer. This method uses the elevation of the temperature caused by condensation of solvent vapor into a solution of the sample substance in the solvent. The rate at which the solvent condenses into the solution, and consequently the temperature elevation, is dependent on the molal concentration of the solution. This is an indirect method of measuring the vapor pressure lowering which is indicative of the sample's molecular weight. See Number—Average Molecular Weight Fundamentals and Determination of Bonner, Dimbat and Stross; New York, Interscience Publishers; 1958; pages 263–268 for further details. The acid number of the polyester may vary from about 3 to about 60 with from about 5 to about 50 being preferred.

In attempting to prepare such polymers, it was found that standard preparative techniques resulted in only small amounts of polyester product which was either totally unuseable or extremely difficult if not impossible to purify. As such, commercial feasibility of the polymer product was extremely doubtful. Methods which find general utility in preparation of polyesters of maleic acid and diols closely related to TMPD in structure, were ineffective in preparation of TMPD-maleate polyesters. Applicants' unique process described as follows overcomes the difficulties of prior are preparatory techniques and results in polymer product of exceptional characteristics. The process has the additional advantage of being useful for preparation of other otherwise difficult to prepare polyesters.

In preparing the present polymers, a sterically hindered diol (for example, 2,2,4-trimethyl-1,3-pentanediol and 2,4-dimethyl-2-ethyl-1,3-hexanediol) is reacted in substantially a 1:1 molar ratio with maleic acid or more advantageously maleic anhydride in the presence of a catalytic amount of an organo-tin catalyst, examples of which includes dibutyl tin oxide, diphenyl tin oxide, dibutyl tin dilaurate, dibutyl tin di-2-ethylehexanoate, and tetraphenyl tin. The reaction mixture is maintained during a preheat cycle at a temperature of less that 145° C. for a period of four hours (e.g., by heating the reaction mixture over the four hour period to slowly raise the temperature to about 145° C.). This preheat period should be at least four hours in duration but can be somewhat longer without appreciably affecting product formation. The mixture is then heated to a temperature not in excess of 200° C. ranging from about 160° to 200° C., an especially useful range being 190° to 200° C. or about 195° C. This reaction temperature may be maintained for about 2–20 hours, but the reaction is usually complete after 6–15 hours at the elevated temperature. The reaction is most advantageously carried out in an inert atmosphere with water being removed as formed.

The polyester product then may be blended with sufficient quantities of a wide variety of comonomers such as styrene, vinyl toluene, methyl methacrylate, diallyl phathalate, triallyl cyanurate, vinyl chloride and vinylidene chloride to give a solution preferably consisting of from 30 to about 50 percent by weight of the comonomer although other concentrations of polyester in a comonomer can be prepared if desired. The concentration of the glycol maleate polyester in these blends may be as high as about 80 percent or more by weight of the blend; but, for most applications, a concentration of from about 50 to 70 percent has been found most desirable.

The requirement of holding the reaction mixture at less than about 145° C. for at least four hours is based on the need to have no free glycol present when temperatures are increased above 145° C. Because of their particular characteristics, these glycols tend to cyclize, dehydrate and isomerize, and generally give undesirable side reactions when subjected to high temperatures. To the contrary, most other glycols can stand higher temperatures, and normal procedures call for rapid heat-up cycles during polyester synthesis. The use of a 4-hour "pre-reaction" period at less than about 145° C. also allows our polyester to isomerize from the cis to the trans form. This isomerization is essential to obtain the needed stability for further reaction at higher temperatures. Maximum temperatures of about 200° C. are specified so that we obtain optimum color properties and the highest molecular weight without undesirable cross-linking and "gelling" of the product.

The omission of a catalyst during synthesis of our glycol maleate polyesters causes incomplete reactions, low molecular weights, high acid numbers, and poor yields. Prior art catalysts (such as zinc chloride and p-toluene sulfonic acid) are not suitable in this invention because they tend to cause decomposition of the glycol. However, we have found that organotin catalysts are uniquely suitable for our reaction. Use of organo-tin catalysts gives rapid and complete reactions, thereby essentially eliminating the above-discussed problems.

It will be seen that the various conditions of our process are necessary because of the special structural features of the sterically hindered diols. Along with the sterically hindered hydroxyl group, these diols are sensitive to thermal decompositon and dehydration and/or rearrangement. However, we have discovered a process as described above which overcomes these difficulties.

The following examples will serve to more fully illustrate the novel features and practices of this invention. However, it will be understood that these are but examples of specific embodiments of this invention and, therefore, not in limitation thereof.

Example 1

A mixture consisting of 150 pounds (1.03 pound moles) of 2,2,4-trimethyl-1,3-pentanediol (TMPD), 90.5 pounds (0.93 pound mole) of maleic anhydride, and 246 g. of dibutyl tin oxide was heated with agitation over a four hour period to raise the temperature slowly to 145° C. Nitrogen was bubbled through the reaction mixture to aid water removal through an outlet on the reactor. The reaction temperature was then increased to 195° C. and maintained at this temperature for seven hours. The weight of water finally obtained was 16.5 pounds. The resulting polyester (215 pounds) was then blended with sufficient styrene to make a 36 percent by weight styrene solution. The polyester and bend properties are given below:

(A) Solid polyester:
(1) Acid number _____ 22
(2) Molecular weight _____ 2500
  (B) 35 percent polyester solution of styrene:
(1) Color (Gardner) _____ 3
(2) Viscosity (Gardner) _____ Y
(3) Acid number _____ 12

(C) Samples of the above polyester-styrene solution and different polyester-styrene solutions, all containing one percent benzoyl peroxide were cast into film and cured. The following physical properties given in Table 1 below were determined for the cured resin systems of polyester dissolved in styrene, the polyesters being specified.

TABLE 1

| Property | TMPD maleate | TMPD terepththalate fumarate | Propylene glycol o-phthalate maleate | Hydroxypropylated bisphenol A fumarate |
|---|---|---|---|---|
| Heat distortion, temp., ° F. | 325 | 238 | 185 | 271 |
| Flexural strength, p.s.i. | 14,682 | 14,297 | 15,580 | 17,200 |
| Flexural modulus, p.s.i. | 3.93×10⁵ | 3.97×10⁵ | 4.86×10⁵ | 4.58×10⁵ |
| Barcol hardness | 45 | 41 | 45 | 850 |

It is apparent from Table 1 that the TMPD maleate polyester has an exceptionally high heat distortion temperature which makes it particularly useful for coating, lamination, or adhesive applications wherein the article may be subjected to physical shock and/or relatively high temperatures. Similar results were obtained through the use of 2,4-dimethyl-2-ethyl-1,3-hexanediol. In contrast with ethylene or propylene glycol maleate polyesters, the present polyesters were found to be compatible with vinyl materials such as styrene, and with common vinyl plasticizers such as di-2-ethylhexyl o-phthalate.

In Table 2 below, the TMPD maleate was prepared as in Example 1, blended with 40 percent styrene, and the system then cured as in Example 1. The propylene glycol o-phthalate maleate polyester was also blended with 40 percent styrene and cured in the same manner as the TMPD maleate-styrene system.

TABLE 2

| Property | TMPD maleate | Propylene glycol o-phthalate maleate |
|---|---|---|
| Heat distortion temp. (° F.) | 325 | 185 |
| Flexural strength, p.s.i. | 14,800 | 14,700 |
| Flexural modulus | 3.8×10⁵ | 4.9×10⁵ |
| Barcol hardness | 45 | 40 |
| Shrinkage, percent | 3.5 | 8.5 |

It is seen that the TMPD maleate-styrene cured system has a much higher heat distortion temperature, somewhat improved flexural strength and substantially lower shrinkage values. Styrene solutions of TMPD maleate polyester when applied to a variety of substrates (see examples below) have shown superior adhesion, excellent dimensional stability and moisture and chemical resistance. Moreover, decorative features can also be readily obtained. For example, pigments and comminuted materials of all kinds can be incorporated into the present polyester-styrene blends to give attractive enamel-like effects. These blends also give coatings with sealing action for porous metal parts and equipment. In addition, these compositions are especially useful as coatings for the interiors of containers and for cinder, concrete, and cement building blocks. Further these polyester-vinyl monomer blends can be applied to a variety of substrates such as wood, metal, plastic and concrete by a variety of well-known techniques, such as spraying, hand lay-up, blade coating and the like. Moreover, the present compositions may be reinforced to give articles of superior strength. If desired, viscosity can be regulated in any well known manner such as by the addition of thixotropic agents such as colloidal silica.

Before application of these blends, any free-radical catalyst such as benzoyl peroxide may be added in concentrations of from about 0.01 to about 10 percent to catalyze the curing or copolymerization reaction. The particular catalysts employed will depend on the required curing conditions such as time and temperature. In the practice of the present invention, benzoyl peroxide is a particularly effective catalyst at temperatures in excess of 60° C. At temperatures lower than 60° C., methyl ethyl ketone peroxide promoted with cobalt naphthenate is an effective catalyst.

The following examples further illustrate the coatings application of the present invention.

Example 2

A TMPD maleate polyester-styrene solution (40 percent styrene) was prepared containing one percent of methyl ethyl ketone peroxide and 0.5 percent cobalt naphthenate. Two percent by weight of colloidal silica was added as a viscosity control agent. Five percent by weight of red pigment was added and the resulting system applied as a coating to steel and aluminum panels. The coating was allowed to cure at about 60° C. for about one hour. These panels showed no significant change after 90 days' outdoor weathering.

Example 3

The same polyester-styrene solution of Example 2 was mixed with two percent benzoyl peroxide and coated on wood panels. Curing was accomplished by heating the panels at 80° C. for about four to six hours. The cured finish had a high gloss and was moisture resistant.

Example 4

The coating composition of Example 2 was used as a gel coat in the manufacture of a commercial resin reinforced glass fiber boat. Compared to the prior commercial gel coats, the present gel coat showed superior wet-out, moisture resistance, and shrinkage values.

Example 5

The coating system of Example 2 was prepared except that the colloidal silica viscosity control agent was omitted. The catalyzed polyester-styrene solution was sprayed on a concrete floor of an acetic acid plant. The cure was effected at room temperature. After six months' service, the coating showed no corrosion from acid contact.

Example 6

A circular earthen container, twelve feet in diameter and four feet in depth, was coated with the composition of Example 2 with the colloidal silica viscosity control agent and red pigment omitted. After the coating cured overnight at about 23° C., the container was filled with salt water. Additional salt water was added as necessary to replace losses due to evaporation. After six months, no appreciable leakage of salt water through the coating had taken place.

Example 7

The coating composition of Example 6 was sprayed on specimens of commercial asbestos and vinyl floor tile and cured at about 23° C. for about four hours. The resulting coatings possessed high gloss and showed excellent resistance to stains and abrasion.

The following Examples 8 and 9 illustrate the improved systems obtained by blending TMPD maleate with other vinyl materials.

Example 8

Two hundred and fifteen pounds of the TMPD maleate of Example 1 was blended with sufficient vinyl toluene to make a 36 percent (based on styrene) solution. The blend had a Gardner color of 3, a Gardner viscosity of 21 and an acid number of 12. Samples of this solution were cured using one percent benzoyl peroxide. The following physical properties were determined on the cured resin.

| | |
|---|---|
| Heat distortion temperature, ° F. | 336 |
| Flexural strength, p.s.i. | 17,223 |
| Flexural modulus, p.s.i. | $3.85 \times 10^5$ |
| Barcol hardness | 48 |

This vinyl toluene blend of TMPD maelate was especially suitable for use in the manufacture of pipe from a fabric of glass fibers.

Example 9

Example 8 was repeated except that 62 parts of the solid TMPD maleate polyester was blended in a mixture containing 17 parts of methyl methacrylate and 21 parts of styrene. The polyester-methyl methacrylate-styrene solution had a Gardner color of two, a Gardner viscosity of five, and an acid number of eleven. Samples of this solution were cured using one percent benzoyl peroxide. The following comparative weathering properties were determined for this cured resin and the resin prepared from the TMPD maleate-styrene solution (40 percent styrene).

WEATHER-O-METER, 100-HOUR TEST

| Cured resin system | Yellow value (Y) | | |
|---|---|---|---|
| | Original | 1,000 hr. | Y |
| TMPD maleate-methyl methacrylate-styrene. | 7.9 | 17.1 | 9.2 |
| TMPD maleate-styrene | 8.6 | 19.4 | 10.8 |

As aforesaid, various reinforcing materials such as fibers may advantageously be incorporated in the present systems. A variety of compounding techniques can be used including hand lay-up, spray-up, matched-die, and filament-winching molding. Any general method for the preparation of reinforced polyester laminates is applicable to the preparation of the present reinforced TMPD maletate polyester laminates. The detailed procedure for preparing TMPD maletate polyester laminates reinforced with a fabric of glass fibers using the matched metal die procedure is given below in Example 10.

Example 10

The solution of Example 1 was catalyzed with two percent of 50 percent benzoyl peroxide in tricresyl phosphate. The viscosity of the catalyst polyester-styrene solution was approximately 200 cps. About 50 g. of this catalyzed solution was poured into the bottom cavity of a warm metal mold. Over this was placed a sheet (13½ x 13½ inches, with a thickness of 10 mils.) of a surfacing mat made from a fabric of glass fibers and finished with a silane coupling. Five 13½-inch x 13½-inch sheets of 1½-ounce reinforcing mat finished with a polyester binder resin were then placed on top of the surfacing mat. Finally, another sheet of 10-mil. surfacing mat was added. Over these layers of mat approximately 200 g. of the said catalyzed solution was poured as evenly as possible. The mold was closed, the temperature was raised to 275° F., and the laminate allowed to cure for ten minutes. The glass content of the molded, 5-poly laminate was about 55 percent and its finished dimensions were 13½ inches x 13½ inches x 0.1 inch. The following Table 3 gives the properties of this molded product.

Table 3

| | |
|---|---|
| Tensile strength (p.s.i.) | 28,500 |
| Flexural strength (p.s.i.) | 34,700 |
| Flexural modulus | $1.31 \times 10^6$ |
| Impact strength, ft.-lb./in., notches Izod | 28 |
| Heat distortion temperature (° F.) | 425 |
| Water absorption, 24-hour, (percent) | 0.09 |

Example 11

The following Table 4 gives the properties obtained by using various other synthetic fiber reinforcing mats with the resin blend of Example 10. These mats were of approximately the same dimensions as the surfacing mats of Example 10, and the molding and cure procedures were the same.

TABLE 4

| Synthetic fiber | Tensile strength, p.s.i. | Flexural strength, p.s.i. | Flexural modulus $\times 10^6$ | Impact strength, ft.-lb./in. notched izod | Water absorption 24 hr., percent |
|---|---|---|---|---|---|
| Nylon (polyamide) | 17,000 | 19,500 | 0.95 | 26.3 | 0.7 |
| Dacron (polyester) | 15,500 | 17,200 | 0.60 | 24.6 | 0.4 |
| Dynel (modified acrylic) | 5,700 | 6,500 | 0.52 | 18.2 | 0.5 |
| Saran (at least 80% vinylidene chloride) | 7,100 | 6,800 | 0.44 | 16.9 | 0.6 |
| Cellulose acetate | 2,500 | 4,200 | 0.31 | 19.4 | 0.8 |
| Polyacrylonitrile | 4,500 | 7,300 | 0.43 | 15.9 | 0.4 |
| Polyvinyl chloride | 3,200 | 8,100 | 0.26 | 15.1 | 0.3 |
| Polyvinyl alcohol | 6,000 | 5,300 | 0.34 | 13.7 | 0.6 |

Example 12

Table 5 gives the properties obtained by using various inorganic fiber reinforcing mats in place of the surfacing mats of Example 10. Again, the mat dimensions and molding procedures were substantially the same as in Example 10.

TABLE 5

| Synthetic fiber | Tensile strength, p.s.i. | Flexural strength, p.s.i. | Flexural modulus $\times 10^6$ | Impact strength, ft.-lb./in. notched izod | Water absorption 24 hr. percent |
|---|---|---|---|---|---|
| Asbestos | 10,000 | 15,000 | 1.35 | 1.15 | 0.2 |
| Aluminum silicate | 18,500 | 27,650 | 1.10 | 24.50 | 0.3 |
| Carbon cloth | 4,200 | 3,850 | 1.55 | 2.65 | 0.4 |
| Zirconium silicate | 15,600 | 23,500 | 1.27 | 26.50 | 0.1 |

As aforesaid, the blend of polyester and comonomer may be compounded with filler and catalyst and then formed into useful objects by any variety of molding techniques well known to the art. In the following examples, the matched metal die technique is used. Cafeteria trays and motor housings, as well as other parts, are made by this molding procedure. In general, any method of molding rigid parts may be used to fabricate cured filler TMPD maleate polyester objects.

Example 13

The TMPD maleate polyester of Example 1 in solution in styrene (40 percent styrene) was catalyzed with two percent benzoyl peroxide. Into the bottom cavity of a metal mold was poured 250 g. of the catalyzed resin-styrene solution which had been mixed with 250 g. of filler. The mold was closed and the temperature raised to 275° F. The cure cycle was ten minutes at 275° F. The finished dimension of the molded part were 13 x 13 x 0.1 inch. The specific properties found on the rigid molded part, and the specific fillers tested in this manner are given in Table 6.

TABLE 6

| Filler | Tensile strength, p.s.i. | Flexural strength, p.s.i. | Hardness (Barcol) | Impact strength, ft.-lb./in. notched izod |
|---|---|---|---|---|
| Asbestos | 4,800 | 7,900 | 75 | 0.55 |
| Calcium carbonate | 7,200 | 6,200 | 70 | 0.30 |
| Silica | 6,400 | 6,500 | 65 | 0.35 |
| Wood flour | 3,100 | 4,950 | 55 | 0.25 |
| Chopped paper | 3,000 | 4,750 | 50 | 0.30 |
| Marble sand | 7,900 | 6,500 | 75 | 0.50 |
| Clay | 5,500 | 7,900 | 70 | 0.35 |

Example 14

(A) A mixture consisting of 64 grams (0.44 mole) of 2,2-dimethyl-1,6-hexanediol and 39 grams (0.40 mole) of maleic anhydride was heated with stirring under an inert gas atmosphere. The time required to reach reaction temperature (218–222° C.) was 80 minutes. After 13 hours of reaction at 218–222° C., the weight of water obtained was 7.0 grams (theor. was 7.2 grams). The weight of organic decomposition material collected overhead was 3.1 grams. The polyester resin was cooled to 140° C. and then blended with sufficient styrene to give a 40 percent styrene solution. The polyester-styrene solution had the following properties:

Molecular weight (solid polyester resin) = 2100
Acid number = 20
Color (Gardner) = 1–2
Viscosity (Gardner-Holdt) = S
Appearance = Clear transparent solution (B) A mixture consisting of 64 grams (0.44 mole) of 2,2,4-trimethyl-1,3-pentanediol and 39 grams (0.40 mole) of maleic anhydride was heated with stirring under an inert gas atmosphere. Exactly the same procedure described in Example 14(A) was followed. After 13 hours of reaction at 218–222° C., the weight of water obtained was 7.0 grams (theor. was 7.2 grams). The weight of organic decomposition material collected was 18 grams. Note that the weight of glycol decomposition products was six times that preceeding example. The polyester resin was cooled to 140° C. and then blended with sufficient styrene to give a 40 percent styrene solution. The polyester-styrene solution had the following properties:

Molecular weight (solid polyester resin) = 1400
Acid number = 72
Color (Gardner) = 5
Viscosity (Gardner-Holdt) = Q
Appearance = Hazy turbid solution As can readily be seen by this example, standard preparative techniques are shown to work well for preparation of polyesters from maleic acid and diols having similar structural characteristics to TMPD. The reaction with the dimethyl hexanediol proceeded easily and product of high quality was obtained. However, when attempting to prepare TMPD-maleate by such methods a definitely inferior product was obtained. Although the process of our invention is applicable to and works well with other sterically hindered glycols, prior art methods do not result in a good quality product with TMPD.

It is evident from the foregoing description that the procedure of Example 1 could be repeated with similar results obtained by using diphenyl tin oxide, dibutyl tin dilurate, dibutyl tin di-2-ethylhexanoate, tetraphenyl tin, or a similar organo-tin catalyst in place of dibutyl tin oxide.

Although this invention has been described in detail with particular reference to preferred embodiments thereof, it will be understood that variations and modifications can be effected within the spirit and scope of the invention as described hereinabove and as defined in the appended claims.

We claim:

1. A process for the preparation of maleate polyester resins of sterically hindered diols, said process consisting essentially of (1) heating a mixture consisting essentially of (a) one mole proportion of a diacid component consisting essentially of a member selected from the group consisting of maleic acid and maleic anhydride and (b) at least one mole proportion of a sterically hindered diol selected from the group consisting of 2,2,4-trimethyl-1,3-pentanediol and 2,4-dimethyl-2-ethyl-1,3-hexanediol in the presence of a catalytic amount of an organo-tin catalyst over a period of at least four hours at a temperature of less than about 145° C. and (2) heating the resultant mixture to a temperature between about 160° C. and about 200° C. for an additional period of at least about two hours.

2. A process as defined in claim 1 wherein said diacid component is maleic anhydride.

3. The process of claim 1 wherein said heating step (2) is to a temperature of about 190–200° C. for a period of about 6 to about 15 hours.

4. A process as defined in claim 1 wherein said organo-tin catalyst is a member selected from the group consisting of dibutyl tin oxide, diphenyl tin oxide, dibutyl tin dilaurate, dibutyl tin di-2-ethylhexanoate, and tetraphenyl tin.

5. A process as defined in claim 4 wherein said organo-tin catalyst is dibutyl tin oxide.

6. A process for preparing maleate polyester resins, said process consisting essentially of (1) heating in an inert atmosphere with agitation over a four hour period to a temperature of about 145° C. a reaction mixture consisting essentially of 2,2,4-trimethyl-1,3-pentanediol, maleic anhydride, and a catalytic amount of dibutyl tin oxide and (2) increasing the reaction temperature to about 195° C. and maintaining said 195° C. temperature for a period of about seven hours.

References Cited

UNITED STATES PATENTS

| 3,042,650 | 7/1962 | Bockstahler | 260—861 |
| 3,194,791 | 7/1965 | Wilson et al. | 260—75 |
| 3,304,347 | 2/1967 | McGary et al. | 260—861 |
| 3,320,336 | 5/1967 | Duke et al. | 260—861 |

FOREIGN PATENTS

| 1,271,106 | 7/1961 | France. |
| 1,052,115 | 3/1959 | Germany. |

WILLIAM H. SHORT, Primary Examiner

LOUISE P. QUAST, Assistant Examiner

U.S. Cl. X.R.

260—485, 861